Patented Apr. 12, 1949

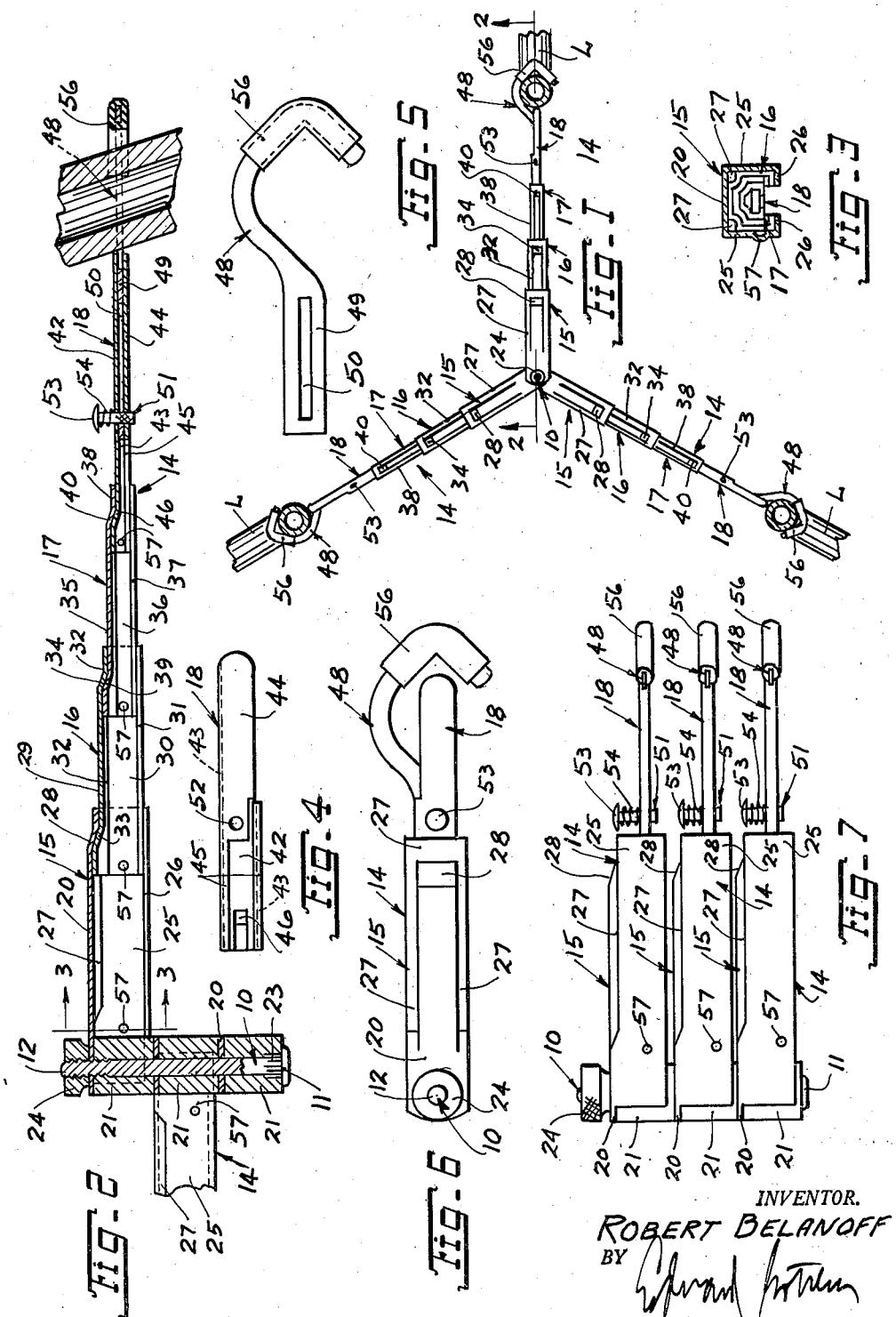

2,467,005

UNITED STATES PATENT OFFICE 2,467,005

TRIPOD STABILIZER

Robert Belanoff, Brooklyn, N. Y.

Application November 26, 1947, Serial No. 788,149

4 Claims. (Cl. 248—192)

This invention relates to new and useful improvements in tripod stabilizers.

More particularly, the invention proposes an improved tripod stabilizer which is characterized by a plurality of superimposed horizontal arms relatively pivotally mounted at their inner ends about a stud and each arm having telescopic sections by which it may be extended and retracted, for opening the stabilizer into operative position when it is used, and for reducing its size for easy storage when not in use.

An important object of this invention is to provide each of the horizontal arms with an adjustably mounted hook for partially engaging about a tripod leg and for clamping the tripod leg against the outer end of said horizontal arm.

The invention proposes a specific way for adjustably mounting each hook, which is characterized by a controlling tapered wedge and by which the hook may be easily released for being moved to various adjusted positions.

The invention also proposes a novel way for pivotally connecting together the superimposed horizontal arms at their inner ends.

Another object of the invention is the construction of a tripod stabilizer as described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is a horizontal sectional view of a tripod showing particularly portions of the tripod legs upon which there is mounted a tripod stabilizer constructed in accordance with this invention.

Fig. 2 is a fragmentary enlarged vertical sectional view taken on the line 2—2 of Fig. 1, and particularly showing details of one of the telescopic arms.

Fig. 3 is a transverse vertical sectional view taken on the line 3—3 of Fig. 2.

Fig. 4 is a bottom view of the outer section of the telescopic arm illustrated in Fig. 2, this outer section being illustrated per se.

Fig. 5 is a plan view of the hook shown mounted on the outer section of the telescopic arm illustrated in Fig. 2, the hook being illustrated per se.

Fig. 6 is a plan view of the tripod stabilizer illustrated in a fully collapsed and folded condition.

Fig. 7 is a front elevational view of Fig. 6.

The new and improved tripod stabilizer, in accordance with this invention, includes a vertical stud 10 having a head 11 at one end and a threaded section 12 at its other end. A plurality of superimposed horizontal arms 14 are relatively pivotally mounted at their inner ends upon the stud 10. These arms 14 are composed of a number of telescopic sections, namely, an inner section 15, a first intermediate section 16, a second intermediate section 17, and an outer section 18.

The inner section 15, of each arm 14, is provided with a horizontal wall 20 through which the vertical stud 10 passes. Bushings 21 are mounted upon the stud 10 in between the horizontal walls 20 for suitably holding the superimposed horizontal arms 14 in spaced positions. The bottom-most bushing 21 is disposed in between the head 11 of the stud 10 and the horizontal wall 20 of the lowermost arm 14. The stud 10 has a small serrated section 23 which is a pressed fit into the lowermost bushing 21 by which the stud 10 is supported and is prevented from accidentally falling out and permitting the arms 14 and the bushings 21 to become easily separated. A clamp nut 24 is threadedly engaged upon the threaded section 12 of the stud 10 by which the arms 14 may be locked in various angular positions, as for example illustrated in Fig. 1, when the tripod stabilizer is in use, or in which they may be locked in a position one above the other, as illustrated in Figs. 6 and 7.

Each inner section 15 has said horizontal wall 20 which is a top wall and which connects with side walls 25 provided with bottom inwardly directed flanges 26. The horizontal top wall 20 is provided with a recessed edge portion 27 extended along each side and its outer end. The outer end of the recessed edge portion 27 is provided with a small tapered section 28.

The first intermediate section 16 has a top wall 29, side walls 30, and bottom flanges 31 along the bottom portions of the side walls 30. The top wall 29 has a recessed edge portion 32 (see Fig. 1), which is provided with inclined sections 33 and 34. The inner end of the first intermediate section 16 is slidably engaged into the outer end of the inner section 15. The inclined portions 28 and 33 engage each other when the sections 16 and 15 are relatively extended for locking the sections in extended positions. The second intermediate section 17 is composed of a top wall 35, side walls 36, and bottom flanges 37. The inner end of the second intermediate section 17 is slidably engaged in the outer end of the first intermediate section 16. The top wall 35 is provided with a recessed edge portion 38, see Fig. 1, which has inclined portions 39 and 40. The inclined portion 39 is cooperative with the inclined portion 34 for holding the second intermediate section 17 in a fully extended position from the first intermediate section 16. The outer section 18 has a top wall 42, side walls 43, a bottom wall 44, and bottom flanges 45. The outer section 18 is slidably engaged in the outer end of the second intermediate section 17. The top wall 42 has a small sloping portion 46 cooperative with the sloping portion 40 of the section 17 for holding the outer section 18 in a fully extended position.

A hook 48 is adjustably mounted on the outer section 18 and is adapted to partially engage about a tripod leg for clamping the tripod leg against the outer end of said outer section 18. More particularly, the hook 48 has a stem portion 49 slidably engaged into the outer end of the outer section 18. This stem portion 49 has a slot 50. A tapered wedge 51 is mounted through a pair of superimposed openings 52 formed in the top and bottom walls 42 and 44, respectively, of the outer section 18 and passes through the slot 50. This tapered wedge 51 is provided with a top head 53. It is urged upwards by a spring 54 coaxial on the wedge 51 and acting between the head 53 and the top face of the section 18. The spring 54 urges the tapered wedge 51 into its fully raised position, as illustrated in Fig. 2, in which position the wedge 51 is gripping the sides of the slot 50 and is thus holding the hook 48 in a fixed position. The head 53 may be pressed downwards to compress the spring 54 and to move the wedge 51 downwards so as to free it from the slot 50. Now the hook 48 may be moved inwards to any selected position and thereafter may be moved outwards as desired. When the wedge 51 is released the spring 54 will move it back to its raised position and thus lock the hook 48, as desired.

A rubber covering 56, or of other friction material, preferably of tubular form, is engaged on the hook 48 for forming a suitable grip for gripping a tripod leg, as hereinafter more fully described. The side walls 25, 30, 36 and 43 are formed with aligned tits 57 positioned near their inner ends and adapted to engage each other when the sections of the arm 14 are contracted so as to hold the sections in their fully contracted positions.

The operation and use of the new tripod stabilizer may be understood from the following:

In Figs. 6 and 7 the device is shown in a folded and contracted condition, in which condition it may be placed in its carrying case or may be stored away. To use the stabilizer the nut 24 is loosened and the arms 14 are swung around to positions in which they are at equal angular distances from each other. The stabilizer is provided with three arms 14 for cooperation with the three legs of a tripod. In Fig. 1 the tripod stabilizer is illustrated applied on the legs L of a tripod. The details of the tripod are not given since they form no part of this invention.

After the arms 14 have been swung around to angular positions the sections of the arms 14 are extended by merely pulling them outwards so as to cause the tits 57 to disengage from each other. Preferably the arms are fully extended so that the tapered portions of the top walls of the sections of the arms, namely, the portions 28 and 33, 34 and 39, and 40 and 46 engage each other and wedge the sections of the arms in their extended positions. The tapered wedges 51 may now be depressed, freeing the hooks 48 which may be extended and engaged about the tripod legs L. The hooks 48 are then moved inwards to positions in which the tripod legs L are wedged in between the hooks 48 and the outer ends of the outer sections 18 of the arms 14. The wedges 51 are released and allowed to lock the arms 48 in selected positions. The tripod stabilizer is now engaged on the legs of the tripod for holding same from spreading. It should be understood that the stabilizer may be suitably moved upwards or downwards on the legs L of the tripod, when adjusting the legs L to various inclined positions for raising or lowering an object supported by the tripod.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention what I claim as new and desire to secure by United States Letters Patent is:

1. A tripod stabilizer, comprising a vertical stud, and a plurality of superimposed horizontal arms relatively pivotally mounted at their inner ends upon said stud, and each of said arms having telescopic sections by which it may be extended and contracted, means for securing said sections in extended and contracted positions, and a hook adjustably mounted on the outer one of said sections of each arm for engaging partially about a tripod leg and clamping the tripod leg against said outer section, each of said outer sections being tubular, each of said hooks having a stem slidably engaging into one side of its tubular section, and means for locking each of said stems in adjusted positions in said tubular sections in order to adjust said hooks in relation to the outer ends of said outer sections.

2. A tripod stabilizer, comprising a vertical stud, and a plurality of superimposed horizontal arms relatively pivotally mounted at their inner ends upon said stud, and each of said arms having telescopic sections by which it may be extended and contracted, means for securing said sections in extended and contracted positions, and a hook adjustably mounted on the outer one of said sections of each arm for engaging partially about a tripod leg and clamping the tripod leg against said outer section, said outer section being tubular, said hook having a stem slidably engaging into said tubular section, and a tapered wedge mounted through opposed walls of said tubular section and engageable with the edges of a slot in said stem for locking said hook in said adjusted positions.

3. A tripod stabilizer, comprising a vertical stud, and a plurality of superimposed horizontal arms relatively pivotally mounted at their inner ends upon said stud, and each of said arms having telescopic sections by which it may be extended and contracted, means for securing said sections in extended and contracted positions, and a hook adjustably mounted on the outer one of said sections of each arm for engaging partially about a tripod leg and clamping the tripod leg against said outer section, said outer section being tubular, said hook having a stem slidably engaging into said tubular section, a tapered wedge mounted through opposed walls of said tubular section and engageable with the edges of a slot in said stem for locking said hook in said adjusted positions, and resilient means for urging said wedge into locking position.

4. A tripod stabilizer, comprising a vertical stud, and a plurality of superimposed horizontal arms relatively pivotally mounted at their inner ends upon said stud, and each of said arms having telescopic sections by which is may be extended and contracted, means for securing said sections in extended and contracted positions, and a hook adjustably mounted on the outer one of said sections of each arm for engaging partially about a tripod leg and clamping the tripod leg against said outer section, said outer section being tubular, said hook having a stem slidably engaging into said tubular section, a tapered wedge mounted through opposed walls of said tubular section and engageable with the edges of a slot in said stem for locking said hook in said adjusted positions, and resilient means for urging said wedge into locking position, said resilient means comprising a spring acting between said wedge and said outer section.

ROBERT BELANOFF.

REFERENCES CITED

The following references are of record in the file of this patent:

UNITED STATES PATENTS

| Number | Name | Date |
| --- | --- | --- |
| 517,211 | Clarke | Mar. 27, 1894 |
| 1,724,320 | Skultity | Aug. 13, 1929 |

FOREIGN PATENTS

| Number | Country | Date |
| --- | --- | --- |
| 128,243 | Switzerland | Oct. 28, 1927 |
| 392,933 | France | Dec. 9, 1908 |